Nov. 12, 1963  J. E. DALGLEISH  3,110,112
METHOD AND APPARATUS FOR GAUGING ARTICLES
Filed March 2, 1960  4 Sheets-Sheet 1

INVENTOR.
JOHN E. DALGLEISH
BY Teare & Fetzer
ATTORNEYS

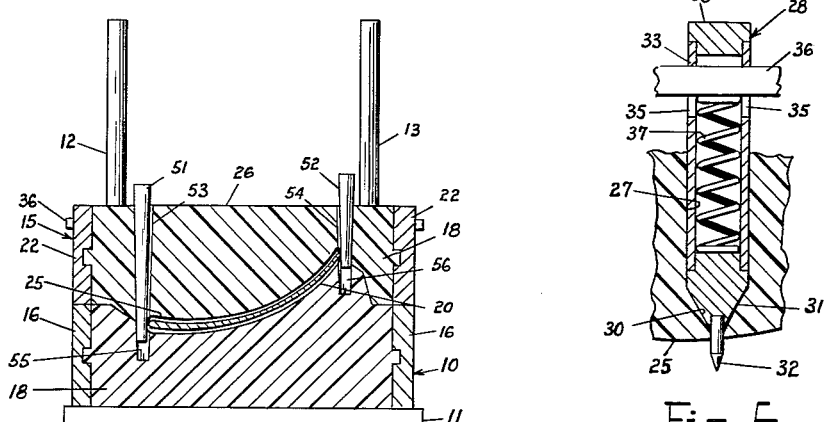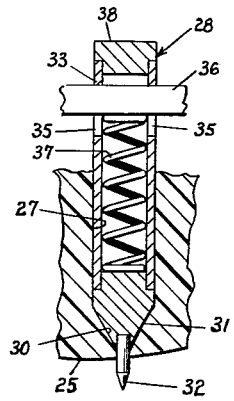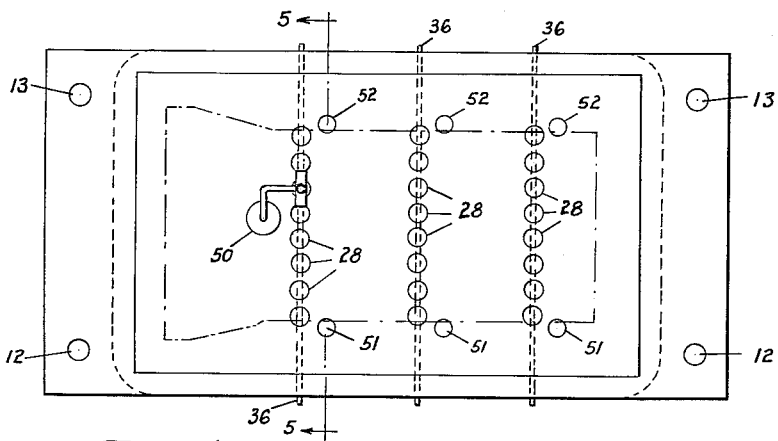

Nov. 12, 1963    J. E. DALGLEISH    3,110,112
METHOD AND APPARATUS FOR GAUGING ARTICLES
Filed March 2, 1960    4 Sheets-Sheet 4

INVENTOR.
JOHN E. DALGLEISH
BY
Teare & Fetzer
ATTORNEYS 3,110,112
METHOD AND APPARATUS FOR GAUGING ARTICLES
John E. Dalgleish, 4501 SW. 24th St.,
Fort Lauderdale, Fla.
Filed Mar. 2, 1960, Ser. No. 12,437
8 Claims. (Cl. 33—174)

This invention relates to a method and apparatus for determining the extent of deviation, if any, of an article, having an irregular contour, from that of a standard or reference article. The invention has particular application in measuring of a turbine blade or vane in the course of production.

One of the difficulties in determining the extent to which the dimensions of a blade, particularly the thickness and position of the edges thereof, are at variance with those of a master blade, has been the length of time required for taking measurements at selected points on the blade. The equipment used for such purpose has been expensive and has had serious limitations in the time required for gauging all desired points on both sides of the blade. A further objection has been that the apparatus previously used did not show the extent to which the blade might be over or under the optimum dimension.

An object of the present invention is to provide a method of gauging and an apparatus for gauging irregularly shaped objects, such as turbine blades, so as to overcome the foregoing problems of expense and time in ascertaining exact measurements.

A further object is to provide apparatus which may be easily and quickly operated for gauging the dimensions either on one or both sides of a blade, and in a manner that will greatly reduce the cost and yet result in a high degree of accuracy for use in blade production.

A further object of the invention is to provide a means for measuring the position of the leading and trailing edges of a blade with reference to those on a master blade.

Briefly, the invention is carried out by holding a blade between two sections of a mold one of which sections is movable with relation to the other. The co-acting sections form a blade cavity which conforms to but which is slightly larger than the dimensions of the blade. The blade is locked between the mold sections and is firmly anchored therein when the root is clamped between the two mold sections. Where the device is intended for gauging only one face of the blade then one section becomes the blade holder and the co-acting section has a plurality of probes carried thereby, each of which is movable with reference thereto and in a direction extending parallel to the direction of movement of the holder. Each probe terminates in a point which projects through the surface of the cavity and is adapted to engage the blade to be measured when the mold sections are brought together. The opposite end of each probe projects through an aperture in a plane surface on the face of the movable section which is opposite to the face containing the cavity. The plane surface constitutes a reference plane for measurement purposes, by comparing the extent to which the individual probes are out of the surface of the plane upon contact with the blade to be measured. Whenever the master blade is in the mold cavity and the mold is closed with the pointed end of each probe in contact with the surface of the blade the opposite ends of all of the probes will lie in the surface of the reference plane. Thus, when the master blade is replaced by one to be gauged, the probe will project above the surface of the reference plane if the blade is thicker than that of the master blade, whereas, if the blade is thinner at such point the probe will be beneath the surface of the reference plane. By using a depth gauge of any suitable form, the extent of such variation can be readily ascertained.

Referring now to the drawings,

FIG. 4 is a top plan view of the apparatus shown in FIG. 1;

FIG. 5 is a vertical section taken on a plane indicated by the line 5—5 of FIG. 4;

FIG. 6 is a vertical section taken through one of the probes but on a scale larger than that shown in FIG. 2;

In the apparatus illustrated in FIGS. 1 to 6, 10 indicates in general a blade holder which is mounted upon a base 11. Guide bars 12 are shown as being rigidly mounted in the base and as extending vertically at spaced points. Preferably, the guide bars are spaced at the corners of a rectangle, one pair of the bars being indicated at 12 and the other pair being indicated at 13. A probe holder 15 is mounted for movement by the bars 12 and 13 which pass through aligned apertures in the probe holder.

Figure 1:
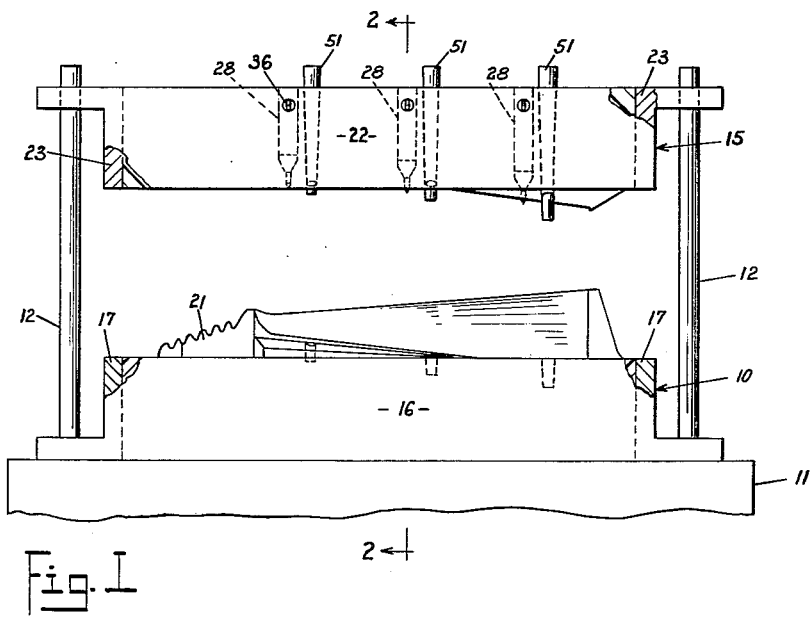
FIG. 1 is a side elevation of a measuring device embodying the present invention and showing apparatus for measuring one face of the blade.
Figure 2:
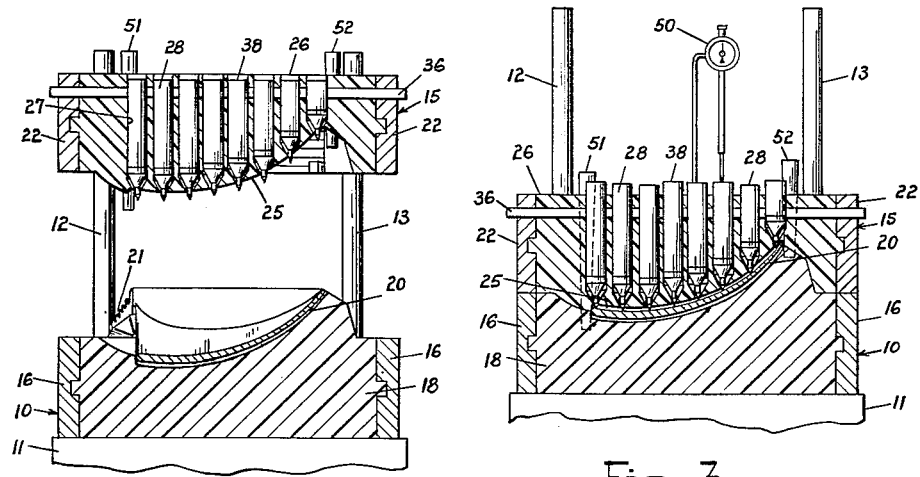
FIG. 2 is a vertical section taken on a plane indicated by the line 2—2 of FIG. 1.
Figure 3:
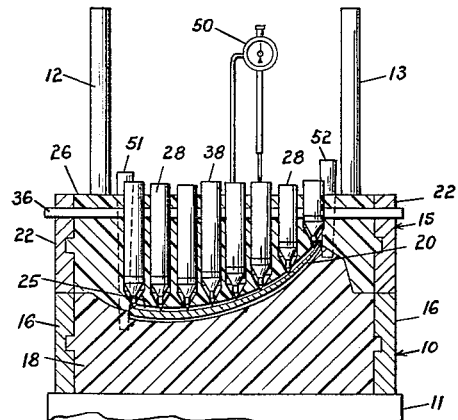
FIG. 3 is a vertical sectional taken on the line 2—2 of FIG. 1 but showing the mold sections in closed positions.

Preferably, the blade holder embodies a hollow frame which may be rectangular in shape having side walls 16 and end walls 17. The frame is filled with moldable material which hardens when exposed to air after a predetermined length of time. Such material is indicated at 18 and may be that which is sold in the trade under the trademark Devcon. In the illustration of FIG. 2, the blade cavity 20 is provided in the upper surface of the blade holder by pressing a master blade into the material before it has set and become hardened.

The root 21 of the master blade is uncovered when pressed into the moldable material 18 but the blade portion which is to be measured is covered with a layer of material, such as masking tape, to a predetermined thickness of about thirty thousandths of an inch so that the blade will be supported by a clamping engagement on the root portion, between the top surface of the mold section 10 and the bottom surface of the mold section 15. The parting line between the upper and lower mold sections deviates from the normal plane surface, as is shown for example in FIG. 2, so as to present the surface to be measured in a satisfactory manner. Preferably, such position is obtained when the root 21 of the blade is embedded substantially one-half in the mold 10 and the other half in the mold 15.

The probe holder, or mold section 15, preferably embodies a hollow frame having side walls 22 and end walls 23. This frame is also filled with the moldable material similar to that used for filling the mold 10. A blade cavity 25 is formed on the under surface of the mold 15 to conform to the shape of the master blade. The cavity in the mold 15 has a tight fitting engagement with the root 21 but the blade receiving portion of the cavity is larger by a predetermined amount, such for example as thirty thousandths of an inch. This may be obtained by the use of masking tape which is placed upon the master blade at the time of molding the cavity in the upper section 15.

The member 15 has the top surface 26 thereof finished to a plane surface which is normal to the axes of the guide rods 12 and 13. This surface then becomes a reference plane for measurement as will be hereinafter set forth. The body portion of the section 15 has a plurality of passageways 27 extending therethrough, in each of which a probe 28 is slidably mounted. The lower end of each aperture has a tapered portion 30 (FIG. 6) which provides a shoulder against which a complementary shaped portion 31 on the probe is adapted to engage. Each probe terminates in a pointed end 32 adjacent the cavity 25 while the other end is disposed adjacent the reference plane 26.

One form of probe, as shown in FIG. 6, includes a hollow tubular casing 33 which is provided with opposed slots 35 through which a bar 36 extends. The ends of the bar are anchored in the walls 22 of the frame thus providing a lost motion connection which enables each probe to move axially a limited distance within its associated passageway 27. A spring 37 positioned within the casing 33 and bearing at one end against the bar 36, and at the other end against the top surface of the probe portion 31, operates to urge the probe downwardly and normally to hold the portion 31 in engagement with the tapered wall 30. This is the normal position when the mold section 15 is raised out of contact with the blade in the section 10.

I have shown a series of probes in a row and a series of rows in the probe holder, with the rows being spaced at selected intervals so as to obtain a measurement at the most desired locations on the blade. In the form shown, there are eight probes in each row and they are spaced apart a sufficient distance to provide adequate material between the casings of the respective probes so as to support them for axial movement within the holder. In the position illustrated in FIG. 2 the top surfaces 38 of the respective probes are positioned beneath the surface of the reference plane 26.

To establish accurately the correct position of each probe when contacting a master blade, each probe initially has sufficient length that it projects slightly above the reference plane 26 when the pointed end of the probe engages the surface of the master blade, at a time when the blade is clamped between the mold sections 10 and 15. At such time the masking tape would be removed from both surfaces of the blade and the blade would be held by clamping action against the root thereof. Then while the blade and probe holders are held in closed position, the projecting ends 38 of the probe are ground until they are in the same plane as the surface 26. This therefore establishes the correct relationship between the probes and the reference plane for the blade to be measured.

Upon replacement of the master blade with a blade to be measured, and upon movement of the probe holder 15 toward the blade holder 10 until the root of the blade is clamped therebetween, the position of the respective probes with respect to the reference plane 26 shows visually the precise location at which the blade to be measured varies or deviates from the corresponding position on the master blade. The extent of such deviation can be measured by means of a depth gauge 50 which rests upon the surface 26 and has the operating member for the indicator moved into engagement with the end of the probe. If a depth gauge having a dial indicator thereon is used, it can be moved along each row so that progressively the deviation in thousandths of an inch can be readily ascertained.

Figure 7:
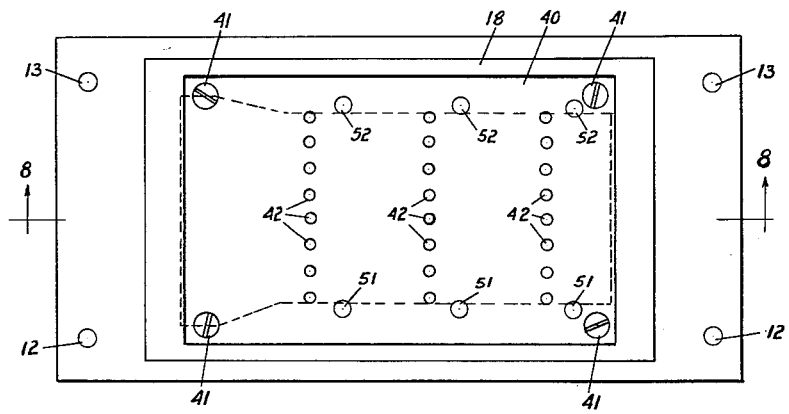
FIG. 7 is a top plan view of a modified form of construction of the probe holder.
Figure 8:
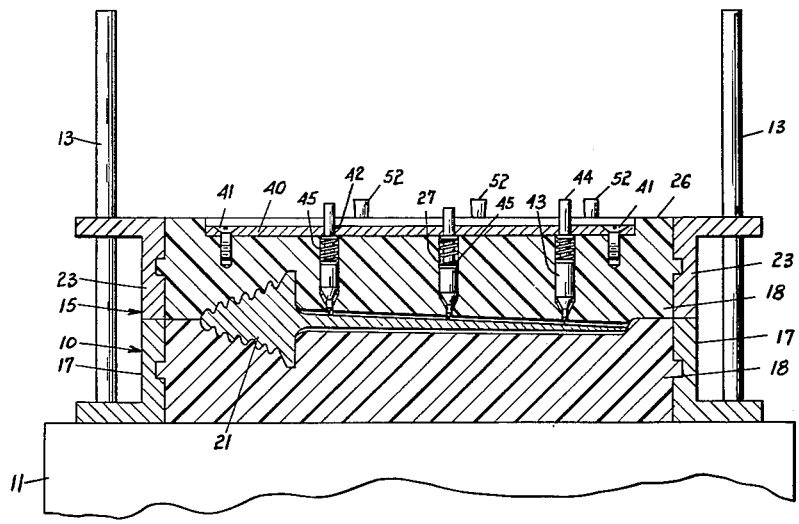
FIG. 8 is a vertical section taken on a plane indicated by the line 8—8 in FIG. 7.

A modification of the invention is shown in FIGS. 7 and 8, wherein corresponding parts have been given corresponding numbers to the parts illustrated in FIGS. 1 to 6 respectively. The difference consists mainly in the mounting structure for the probe and in the formation of the probes themselves. Thus, instead of bars 36 which extend through the probes in each row, I have shown a plate 40 which is fastened, as by securing members 41, to the body portion of the probe holder. The top surface of this plate is disposed below the reference plane but is parallel to it, and the plate is provided with apertures 42 which are arranged in a row in registration with the passageways 27 in the body of the holder.

The probe of FIG. 8 is shown as being tubular in form, at 43, and as having a stem 44 which projects through an aperture in the plate 40. The top of the body portion provides a shoulder against which one end of a spring 45 is adapted to engage, while the other end engages the under surface of the plate 40. In this form of the invention the projecting ends of the respective probes are coextensive with the plane 26 whenever the points are in contact with the surface of the master blade.

To gauge the position of the leading and trailing edges of the blade, I have shown tapered pins 51 and 52 which extend through passageways 53 and 54 respectively in the holder 15, and which are adapted to enter registering recesses 55 and 56 respectively in the holder 10. The extent, therefore, to which the pins 51 and 52 can enter the respective apertures upon engagement with the leading and trailing edges of the master blade determines the correct location of the edges. Whenever a blade to be measured is clamped between the mold sections, the extent to which the pins 51 and 52 deviate from the reference plane 26 determines the extent to which the edge to be measured varies to the right or left of the optimum position, as established by the master blade.

Figure 9:
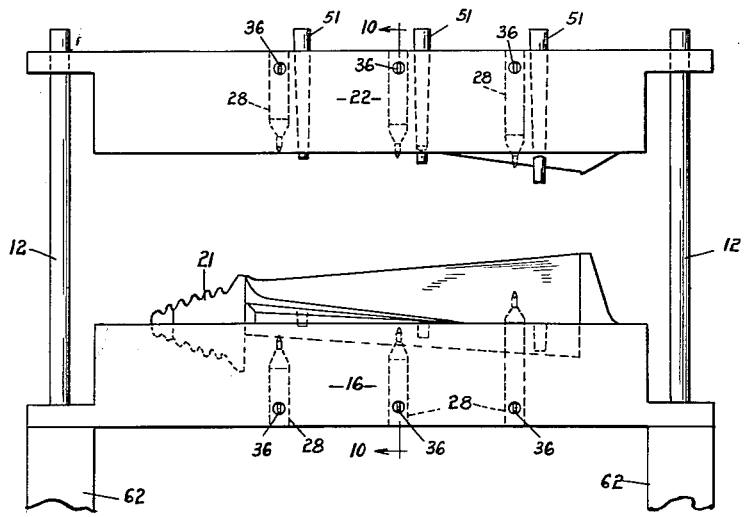
FIG. 9 is a side elevation of a gauging device which is arranged for gauging both sides of a blade while the blade is clamped between the probe holders.
Figure 10:
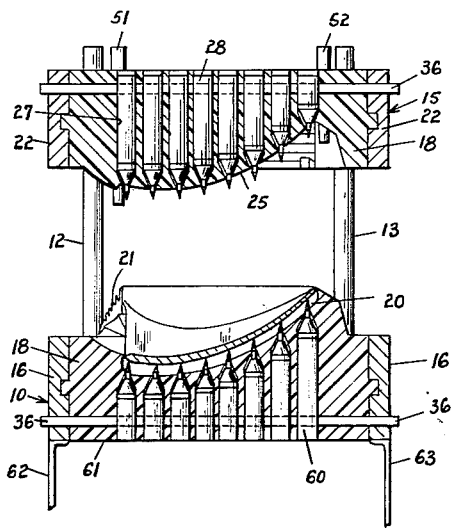
FIG. 10 is a vertical section taken on a plane indicated by the line 10—10 in FIG. 9.

To permit the blade to be gauged on both sides while clamped between the holders, I have shown an apparatus in FIGS. 9 and 10 wherein the lower holder or section 10 is provided with probes similar to those of the section or holder 15. In FIG. 10, the probes are indicated at 60 and each is shown in contact with the lower surface of a master blade. At such time the ends of the probes remote from the blade are in the same plane as a reference plane 61. With such arrangement, both faces of the blade can be gauged while the mold is closed and the blade is clamped therebetween. To facilitate measurement, the holders, when clamped, can be supported upon spaced bars 62, 63 while gauging one face and then inverted as a unit and rested upon the bars for gauging the opposite face. When closed, the mold sections may be clamped together in any suitable manner so as to hold the blade firmly during the gauging operation.

An advantage of the method and apparatus embodying the present invention is that the blade can be measured not only for thickness and for position of the leading and trailing edges thereof, but also for any deviations in lean, bow or twist of a blade with reference to a master blade as a standard of comparison. The invention effects a great saving in time and enables the measurements to be made quickly at the grinding machine without necessitating a large investment in expensive equipment.

I claim:

1. An apparatus for gauging a three-dimensional article with reference to a three-dimensional master article comprising in combination, a first holder, a second holder, parallel guide members disposed on said first holder and slidably received through openings in said second holder for moving the latter in a rectilinear path toward and away from said first holder, said second holder having a planar reference surface disposed normal to the axes of said guide members, said second holder having a plurality of passageways extending therethrough, a plurality of probe members carried by said second holder and slidably registered within said passageways, each of said probe members including an elongated hollow tube having closed end portions, each of said tubes having opposed slots therein extending longitudinally thereof, an elongated rod coactingly received through said slots in some of said probe members, said rod being attached at its opposite ends to said second holder to provide a lost motion connection between some of the probe members and the second holder whereby said probe members may move axially a predetermined distance within the respective associated passageways, resilient means operably coacting with said probe members normally urging them in a direction away from said planar reference surface toward said first holder, said probe members yieldably projecting from the passageways in said second holder on the opposite side from said planar reference surface when the respective holders are normally separated and adapted to be slidably moved through said passageways toward the planar reference surface when the probe members contact an article in said first holder, and the ends of the respective probe members adjacent the planar reference surface being accessible for measuring the extent of movement of said probe members in relation to said planar reference surface.

2. An apparatus in accordance with claim 1, wherein said resilient means includes a coil spring disposed within each of said hollow tubes, each spring bearing at one end against said rod member and bearing at its other end against a closed end portion of said tube.

3. In a gauging apparatus for measuring a three-dimensional blade with reference to a three-dimensional master blade, a probe holder comprising a body portion having a planar reference surface on one side thereof, said body portion including a plurality of elongated probe receiving passageways extending therethrough, each having tapered wall portions adjacent the side opposite said planar reference surface, a plurality of probes having pointed ends disposed for axial movement in the respective of said passageways, said probes having a length such that the ends of the probes opposite the pointed ends thereof lie in a common plane which is substantially coextensive with said planar reference surface when the probes are in engagement with a master article, resilient means operably coacting with said probes to urge them normally in a direction away from said planar reference surface, complementary tapered portions on the body of each of said probes and adapted for coacting abutting engagement with the tapered wall portions of said probe receiving passageways for limiting axial movement of said probes in one direction with reference to said probe holder, the pointed ends of the probes disposed to project beyond said probe holder when said tapered portions are in engagement with one another, and said probes having the ends thereof opposite the pointed ends accessible adjacent said planar reference surface for measuring the deviation between the respective probes and said planar reference surface upon engagement of the probes with the blade to be measured.

4. In an apparatus in accordance with claim 3, including a blade holder having a cavity for supporting a blade therein, parallel guide members extending from said blade holder and slidably received through openings in said probe holder for moving the latter in a rectilinear path toward and away from said blade holder.

5. In an apparatus in accordance with claim 4, wherein said probe holder includes a plurality of pin receiving passageways disposed outwardly of said probe receiving passageways for registration with corresponding pin receiving passageways in said blade holder, a plurality of tapered pins disposed for movement in said pin receiving passageways, said pins coacting with said planar reference surface on the probe holder as an indication of the extent to which the pins enter the respective pin receiving passageways for gauging the leading and trailing edges of the blade to be measured upon engagement therewith.

6. An apparatus for gauging a three-dimensional blade with reference to a three-dimensional master blade, comprising a blade holder having side and end wall portions, a probe holder, parallel guide members extending from said blade holder and slidably received through openings in said probe holder for moving the latter in a rectilinear path toward and away from the said blade holder, said probe holder having a planar reference surface on one side thereof and a plurality of probe receiving passageways extending therethrough, a plurality of probe members having pointed ends slidably disposed within said probe receiving passageways, a lost motion connection between said probe members and said probe holder to cause each probe member to move axially a predetermined distance within its associated passageway, resilient means operably coacting with said probe members normally urging them in a direction toward said blade holder, said probe members yieldably projecting from the passageways in said probe holder on the opposite side from said reference plane when the respective holders are normally separated and adapted to be slidably moved through said passageways toward the reference plane when the probe members contact a blade in the blade holder, and the ends of the probe members adjacent said reference plane being accessible for measuring the extent of the movement of said probe members in relation to said reference plane, said blade holder having a cavity for receiving the root and blade portions of a blade therein, and a probe holder having a cavity with corresponding root and blade receiving portions therein, such that a blade will be supported in spaced relation in the cavity between said holders by clamping engagement on the corresponding root portions of said cavities.

7. An apparatus for gauging a three-dimensional blade with reference to a three-dimensional master blade, comprising a blade holder having side and end wall portions, a probe holder, parallel guide members extending from said blade holder and slidably received through openings in said probe holder for moving the latter in a rectilinear path toward and away from said blade holder, said probe holder having a planar reference surface on one side thereof and a plurality of probe receiving passgeways extending therethrough, a plurality of probe members having pointed ends slidably disposed within said probe receiving passageways, said probe members comprising hollow elongated tubes closed at both ends thereof, each of said probe members having opposed slots therein, a lost motion connection between said probe members and said probe holder to cause each probe member to move axially a predetermined distance within its associated passageway, said lost motion connection including an elongated rod coactingly received through said opposed slots in said hollow tubes and being attached at its opposite ends to said probe holder, resilient means operably coacting with said probe members normally urging them in a direction toward said blade holder, said probe members yieldably projecting from the passageways in said probe holder on the opposite side from said reference plane when the respective holders are normally separated and adapted to be slidably moved through said passageways toward the reference plane when the probe members contact a blade in the blade holder, and the ends of the probe members adjacent said reference plane being accessible for measuring the extent of movement of said probe members in relation to said reference plane.

8. An apparatus in accordance with claim 7, wherein said resilient means includes a coil spring disposed within each of said hollow tubes, each spring bearing at one end against said elongated rod member and bearing at its other end against the closed end of said tube.

References Cited in the file of this patent

UNITED STATES PATENTS

| 1,364,534 | Walter | Jan. 4, 1921 |
| 1,504,547 | Egerton | Aug. 12, 1924 |
| 1,554,697 | Alden | Sept. 22, 1925 |
| 2,039,105 | Naery | Apr. 28, 1936 |
| 2,394,489 | Rowe | Feb. 5, 1946 |
| 2,835,942 | Razdow | May 27, 1958 |
| 2,839,836 | Fuller | June 24, 1958 |
| 2,880,516 | Tandler | Apr. 7, 1959 |